US012494629B2

(12) United States Patent
Nowastowski-Stock

(10) Patent No.: US 12,494,629 B2
(45) Date of Patent: Dec. 9, 2025

(54) ARRANGEMENT HAVING A CABLE WALL LEAD-THROUGH FOR A PLURALITY OF CABLES, AND CONNECTOR

(71) Applicant: CONTA-CLIP VERBINDUNGSTECHNIK GMBH, Hövelhof (DE)

(72) Inventor: Jörg Nowastowski-Stock, Detmold (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 499 days.

(21) Appl. No.: 17/889,032

(22) Filed: Aug. 16, 2022

(65) Prior Publication Data

US 2023/0059172 A1 Feb. 23, 2023

(30) Foreign Application Priority Data

Aug. 17, 2021 (DE) .......................... 102021121353.3

(51) Int. Cl.
*H02G 3/22* (2006.01)
*H01R 13/506* (2006.01)
(Continued)

(52) U.S. Cl.
CPC ............. *H02G 3/22* (2013.01); *H01R 13/506* (2013.01); *H01R 13/516* (2013.01); *H01R 13/5208* (2013.01)

(58) Field of Classification Search
CPC ...... H02G 3/22; H01R 13/506; H01R 13/516; H01R 13/5028
(Continued)

(56) References Cited

U.S. PATENT DOCUMENTS 7,762,842 B2   7/2010  Deubel et al.
11,901,719 B2  2/2024  Nowastowski-Stock et al.
(Continued)

FOREIGN PATENT DOCUMENTS

DE   202015102280 U1   5/2016
DE   102015100763 A1   7/2016
(Continued)

OTHER PUBLICATIONS

Office Action issued in related Japanese Patent Application JP 2022-129587, Dated Aug. 18, 2025.

*Primary Examiner* — Timothy J Thompson
(74) *Attorney, Agent, or Firm* — Harness, Dickey & Pierce, P.L.C.

(57) ABSTRACT

An arrangement having a cable wall lead-through is presented, which cable wall lead-through has a housing in which wall portions delimit a housing interior (3) on several sides, and a cable wall lead-through in a region of a wall opening that is formed in one of the wall portions to lead a plurality of cables through, the cable wall lead-through having the following: a receptacle frame that is integrally formed on the wall portion so as to at least partially encompass the wall opening and with which a receptacle is formed opposite the wall opening; at least one sealing element that is arranged in the receptacle and with which sealed passages are provided for the plurality of cables, each of which sealed passages is configured to receive in a sealing manner a cable to lead through the wall opening; and a cover component associated with the receptacle frame.

14 Claims, 8 Drawing Sheets

(51) Int. Cl.
*H01R 13/516* (2006.01)
*H01R 13/52* (2006.01)

(58) Field of Classification Search
USPC .......................................................... 174/667
See application file for complete search history.

(56) References Cited

U.S. PATENT DOCUMENTS

| | | |
|---|---|---|
| 12,040,574 B2 | 7/2024 | Ehmann et al. |
| 2013/0099452 A1 | 4/2013 | Hein et al. |
| 2015/0155696 A1 | 6/2015 | Coenegracht et al. |
| 2021/0087960 A1* | 3/2021 | Okamoto .............. F01N 3/2026 |
| 2022/0085588 A1* | 3/2022 | Nowastowski-Stock ................... H02G 3/22 |

FOREIGN PATENT DOCUMENTS

| | | |
|---|---|---|
| DE | 102016213873 A1 | 2/2017 |
| DE | 102016223425 A1 | 5/2018 |
| DE | 202019100362 U1 | 4/2020 |
| DE | 102019205115 B3 | 8/2020 |
| EP | 791984 B1 | 5/2003 |
| EP | 3404789 A1 | 11/2018 |
| JP | 2021-111462 A | 8/2021 |
| WO | WO-2018096136 A1 | 5/2018 |
| WO | 2020/151785 A1 | 7/2020 |
| WO | WO-2020207796 A1 | 10/2020 |

* cited by examiner

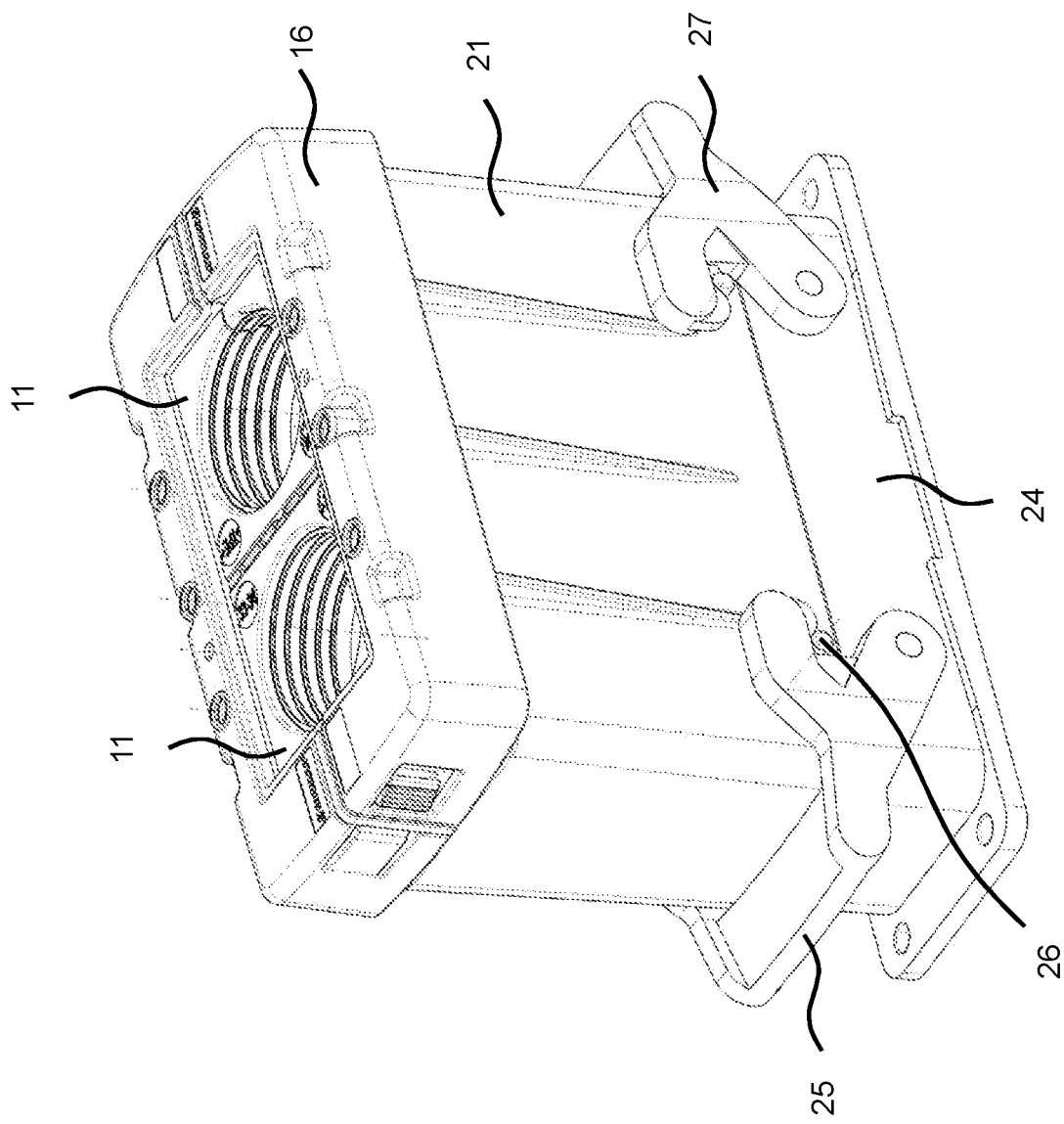

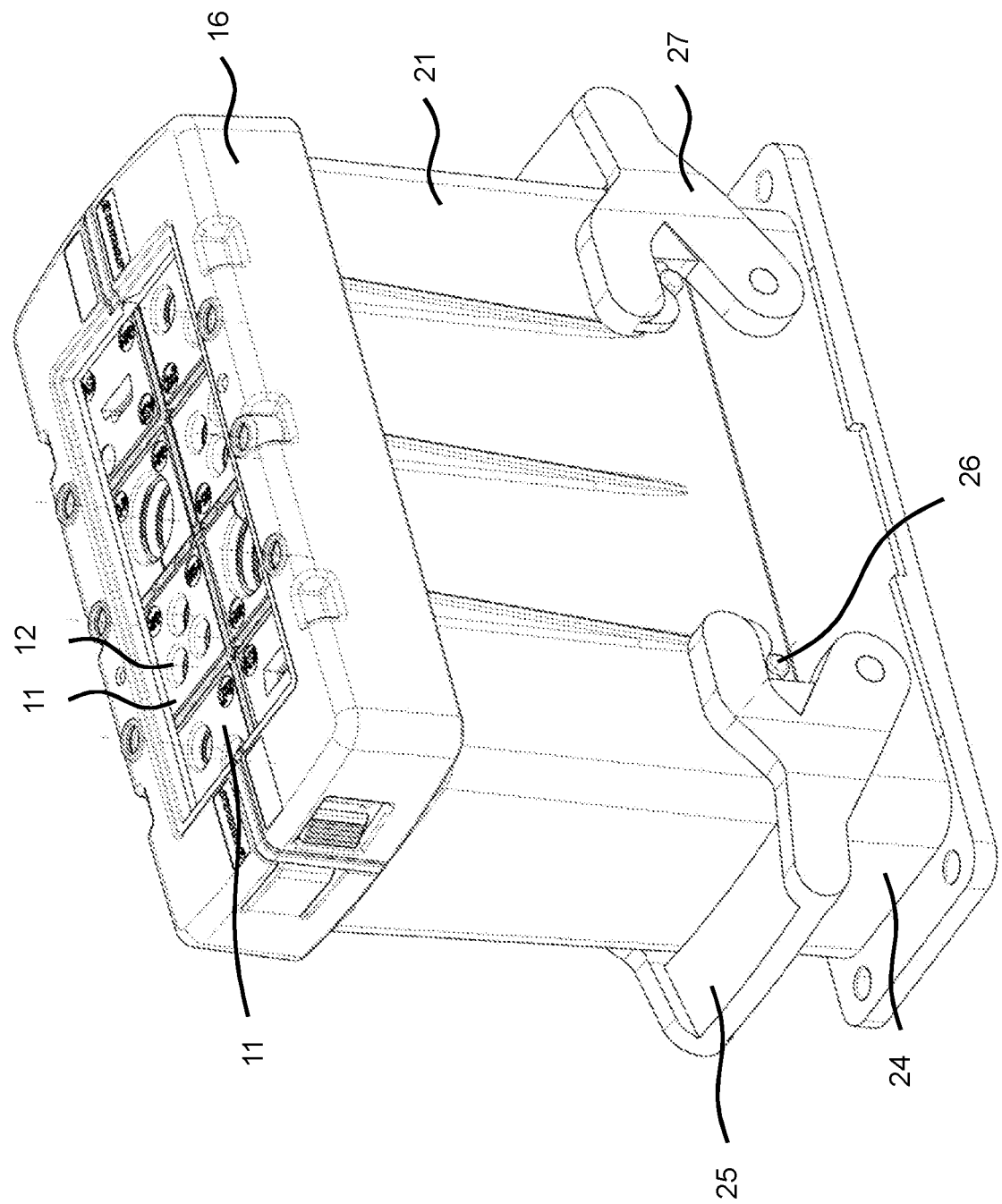

ARRANGEMENT HAVING A CABLE WALL LEAD-THROUGH FOR A PLURALITY OF CABLES, AND CONNECTOR

CROSS-REFERENCE TO RELATED APPLICATIONS

This application claims the benefit and priority of German Patent Application Number filed 102021121353.3, filed Aug. 17, 2022. The entire disclosure of the above application is incorporated herein by reference.

FIELD

The invention relates to an arrangement having a cable wall lead-through for a plurality of cables and to a connector.

BACKGROUND

A cable wall lead-through serves to lead cables through an opening or a breakthrough in a wall portion from one side of the wall portion to the other, in particular to insert cables into a housing, for example a cable cabinet. In this case, the passage of the cables through the wall opening must be regularly sealed in order to seal off the housing interior from the environment. For this purpose, provision can be made to use what are referred to as sealing elements for the cable wall lead-through, which sealing elements have a cable passage in which the cable to be led through can be received in a sealing manner.

A conduit lead-through having a base frame and having at least one conduit lead-through module is disclosed in EP 3 404 789 A1, which conduit lead-through module is provided with one or more passage opening(s) for a respective cable. The external dimensions of the conduit lead-through modules are adapted to the internal cross section of the base frame such that the conduit lead-through modules can be arranged in the internal cross section of the base frame. At least one holding part is also attached to the base frame, by means of which holding part the conduit lead-through modules can be captively fixed in the base frame. According to EP 3 404 789 A1, it is provided that the at least one holding part fastened to the base frame can be moved back and forth between a holding position in which said holding part captively fixes the conduit lead-through modules in the base frame and a release position in which the conduit lead-through modules can be removed from the base frame and inserted into the base frame.

Cable wall lead-throughs and connectors are also described in DE 20 2015 102 280 U1, DE 10 2016 223 425 A1, WO 2018/096 136 A1, WO 2020/207 796 A1 and DE 10 2016 213 873 A1.

SUMMARY

The object of the invention is to provide an arrangement having a cable wall lead-through for a plurality of cables, with which cable wall lead-through a secure and sealed wall lead-through for a plurality of cables can be produced with reduced installation effort. In addition, a connector having an improved cable wall lead-through is to be provided.

The object is achieved by an arrangement having a cable wall lead-through for a plurality of cables according to independent claim 1 and by a connector according to subordinate claim 14. Embodiments are the subject matter of dependent claims.

According to one aspect, an arrangement having a cable wall lead-through for a plurality of cables is created, which cable wall lead-through has: a housing in which wall portions surround a housing interior on several sides; and a cable wall lead-through in a region of a wall opening that is formed in one of the wall portions to lead a plurality of cables through. The cable wall lead-through has the following: a receptacle frame that is integrally formed on the wall portion so as to at least partially encompass the wall opening and with which a receptacle is formed opposite the wall opening; at least one sealing element that is arranged in the receptacle and with which sealed passages are provided for the plurality of cables, each of which sealed passages is configured to receive in a sealing manner a cable to lead through the wall opening; and a cover component associated with the receptacle component, which cover component is installed in the receptacle in a securing manner the at least one sealing element.

According to a further aspect, a connector, in particular a plug connector, is provided with the arrangement.

The housing on which the cable wall lead-through is arranged can be a one-part or multi-part housing. For example, a one-part base housing can be provided with a housing cover to be mounted thereon in order to close the housing interior. In one embodiment, the housing is a portable housing, in particular as part of a portable apparatus that is formed with the cable wall lead-through.

The wall portion having the opening or breakthrough that is associated with the cable wall lead-through can consist of a plastics material, for example produced by means of injection molding. The housing can be made entirely of plastics material. Alternatively, different mate-rials, for example plastics and metal, can be used for the wall portion and/or the housing.

Integrally forming the receptacle frame on the wall portion in such a way that the receptacle frame partially or substantially completely surrounds the wall opening reduces the installation effort when producing the cable wall lead-through. Work steps are eliminated in the production of the cable wall lead-through on the housing, in particular a necessary fastening installation of the receptacle frame. A correct position of the receptacle frame in relation to the wall opening is also always ensured in this way so that the further elements of the cable wall lead-through are then correctly installed.

The receptacle frame can be formed with a frame wall that protrudes from the outer side of the wall portion and is integrally formed on the wall portion. In this case or in other embodiments, an inner side of the frame wall can be arranged flush with inner-side surfaces of the wall opening. In this or other embodiments, after installation the at least one sealing element arranged in the receptacle frame can extend either only in the region opposite the receptacle frame or, alternatively, also into the region of the inner-side surfaces of the wall opening, it being possible for contact to be formed between opposite surfaces in each case. In one embodiment, the frame wall is arranged on a base portion and integrally formed thereon, which base portion is, for its part, integrally formed on the wall portion having the wall opening and partially or completely surrounds said wall opening.

The frame wall can be formed with supporting wall portions that support the frame wall in an upright position on the outer side of the wall portion. The supporting wall portions can, for example, have a polygonal cross-sectional area, in particular a triangular shape. One or more of the supporting wall portions can be arranged in corner regions of the frame wall surrounding the wall opening.

The frame wall can have honeycomb wall regions. As a result of this, a material-saving and mechanically stable design of the frame wall is supported at least in portions.

The receptacle frame can substantially completely encompass the wall opening. In this case, the receptacle frame can be designed substantially continuously or interrupted around the wall opening.

A frame component can be arranged in the receptacle, which frame component divides the receptacle into a plurality of sub-receptacles that are each configured to receive a sealing element with which at least one sealed passage is provided for one of the plurality of cables. One or more partition walls can be formed within the receptacle using the frame component in such a way that the plurality of sub-receptacles are formed to respectively receive one or more sealing elements. In this or other embodiments, the sealing elements are made of a resilient material, such that the material of the sealing element is pressed in a sealing manner against the cable received in a passage after being installed around said cable.

The frame component, which is designed in one or more parts, can be detachably installed within the receptacle, for example by means of a plug connection and/or clamp connection. Alternatively, non-detachable installation can be provided. The frame component can be detachably arranged in associated plug receptacles that are arranged on the inner side of the frame wall.

The plurality of sub-receptacles for the sealing elements can be formed with a cross section that widens outward (away from the housing). The sealing elements can have a (negative) outer shape adapted thereto, such that a clamping effect for the sealing elements when they are inserted into the associated sub-receptacle increases as they are inserted further and further into the sub-receptacle.

The receptacle frame can be configured for inserting the at least one sealing element into the receptacle space from the outside on a side facing away from the housing. In this case, the sealing element is installed in the receptacle from the outside. In this or other embodiments, the receptacle space can have a cross section that widens outward away from the housing.

The cover component can be installed without tools. For example, a clamp, plug and/or click connection can be provided in order to design the cover component in such a way that it can be installed without tools.

The cover component can be installed with the help of a connecting device formed on the receptacle frame. The connecting device on the receptacle frame interacts with associated connecting elements on the cover component in order to install the cover component after the one or more sealing elements have been arranged in the receptacle. Alternatively or addition-ally, the connecting device can be designed to install the cover component on the wall portion. The connecting device and the associated connecting elements with which the cover component is installed can, after the cover component has been installed, be arranged on the inside, i.e., for example, covered by the cover component itself.

In the installed position, the cover component can encompass a housing corner region in which the wall portion is connected to an adjacent wall portion of the housing. In this embodiment, in the installed position, the cover component encompasses corner regions of the housing in which wall portions of the housing meet, be it in partial portions of housing edges or all the way around, either continuously or interrupted. The wall portions can be connected in one piece in the corner regions.

The cover component can be arranged such that it overlaps the at least one sealing element on the edge side from a view onto the wall opening. This contributes to securing the sealing elements after they have been installed in the receptacle.

The cover component can be formed in several parts with a plurality of cover elements in such a way that, when the cover component is installed, that is, during installation, one of the cover elements is being connected to at least one other of the cover elements with the help of mutually associated connecting elements. The connecting elements on the cover elements can be designed in such a way that the cover elements to be connected are to be guided in a connecting direction when they are brought together and when they are separated from one another, which connecting direction is transverse to the passage direction of the wall opening. A plug, clamp and/or click connection can be provided, for example, between the cover elements in order to connect said cover elements without tools in the case of such connection types or others.

The housing can be a connector housing, in particular a plug connector housing, that is configured to receive a (plug) connector component having electrical contact elements in the housing interior. In this case, the cable wall lead-through serves to insert the plurality of cables from the outside into the connector housing in order to connect them there to the electrical contact elements of the connector component, with which electrical contact elements, for example, contact pins and/or contact sockets are provided. In order to secure the connector housing after the connector housing has been plugged together with an associated connection housing, securing elements can be provided on the connector housing, for example housing projections and/or pivoting securing elements that interact with associated securing elements on the connection housing, such that the detachable connection can be secured against being unintentionally detached. In the connector housing, a further wall opening through which access to the contact elements is formed can be arranged opposite the wall opening having the cable wall lead-through.

The embodiments explained above relating to the arrangement having the cable wall lead-through for a plurality of cables can be provided accordingly in connection with the connector.

DRAWINGS

Further embodiments are explained below with reference to the drawings, in which:

FIG. 7 is a schematic perspective of the arrangement from FIG. 5 with the formed cable wall lead-through; and FIG. 8 is a schematic perspective view of a further arrangement having a connector having an alternative cable wall lead-through on the connector housing.

DETAILED DESCRIPTION

Figure 1:
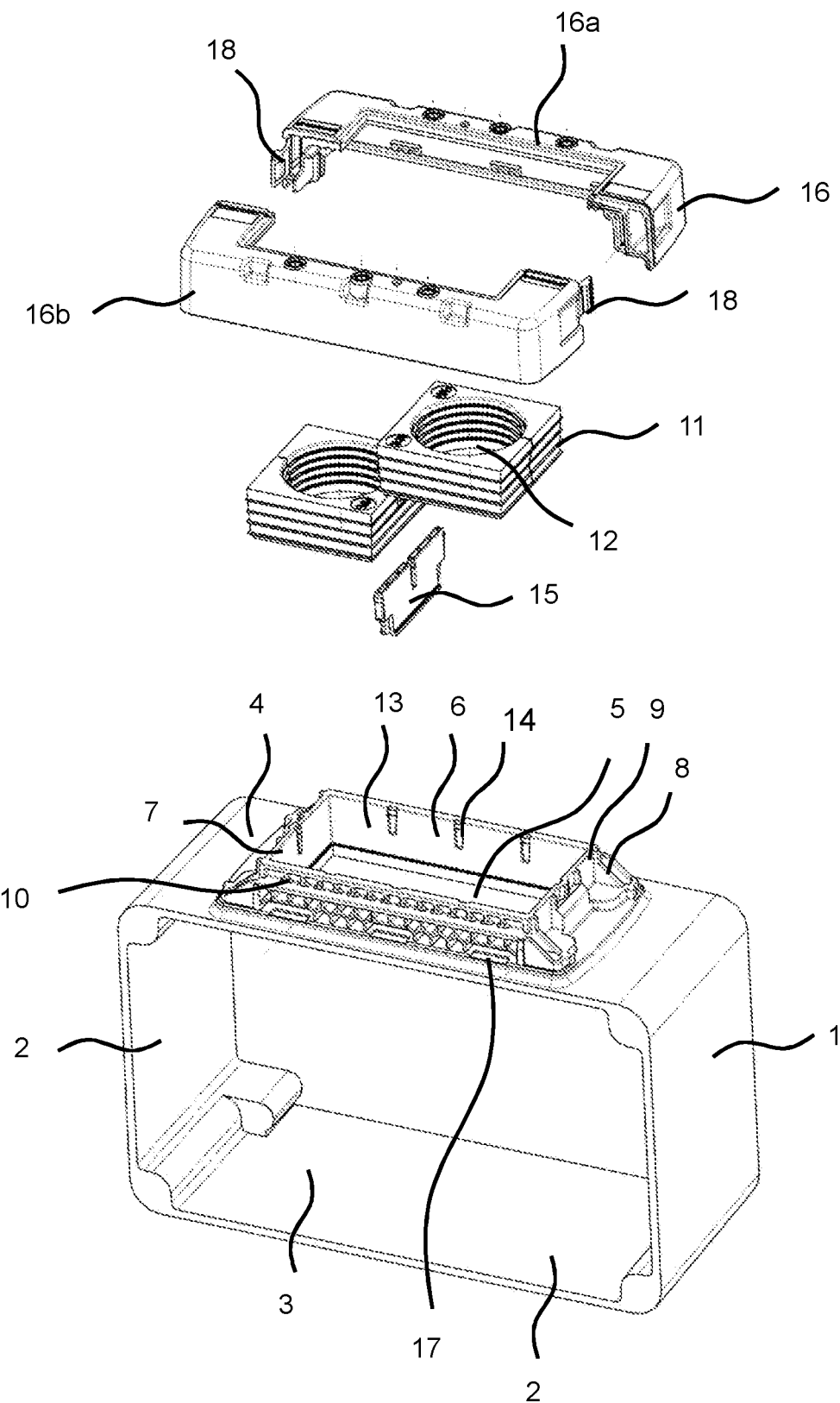
FIG. 1 is a schematic perspective view of an arrangement having a cable wall lead-through on a housing before the cable wall lead-through is formed.

FIG. 1 shows a schematic perspective view of an arrangement having a housing 1 in which wall portions 2 surround a housing interior 3 on several sides. A housing opening 5 is formed in a wall portion 4 in order to lead cables (not shown) through the housing opening 5. A receptacle frame 6 is integrally formed on the wall portion 4 in such a way that it surrounds or encompasses the wall opening 5. The integrally formed receptacle frame 6, which is formed with a peripheral frame wall 7, can be formed, for example, by means of injection molding. In the alternative case of a metal housing, it can be provided that the receptacle frame 6 is produced by means of bent wall portions. The housing interior 3 can be closed with a housing cover (not shown).

In the embodiment shown, supporting wall portions 8 are provided on the outer side of the frame wall, in particular in corner regions 9 of the receptacle frame 6. A partial wall portion 10 is formed in a honeycomb shape.

To form a cable wall lead-through in the region of the wall opening 5, sealing elements 11 are provided, each having a passage 12 for receiving a cable (not shown). In the region of an inner side 13, the frame wall 7 has plug receptacles 14 for a frame component 15, such that the frame component 15 can be detachably arranged in the receptacle formed with the receptacle frame 6 in order to provide separate sub-receptacles for the sealing elements 11, which sub-receptacles, in the embodiment shown, each receive one of the sealing elements 11.

When the sealing elements 11 (having the cables) are arranged in the receptacle in the receptacle frame 6, a cover component 16 is installed that, in the embodiment shown, is configured in two parts with components 16a, 16b. Alternatively, a one-part design can be provided. The cover component 16 can be installed without tools with the help of a connecting device 17 that, in the example shown, is designed with connecting elements on the receptacle frame 6 on the one hand and on the cover component 16 on the other (see FIG. 2).

The components 16a, 16b of the cover component 6 can be detachably connected by means of a connecting device 18.

Figure 2:
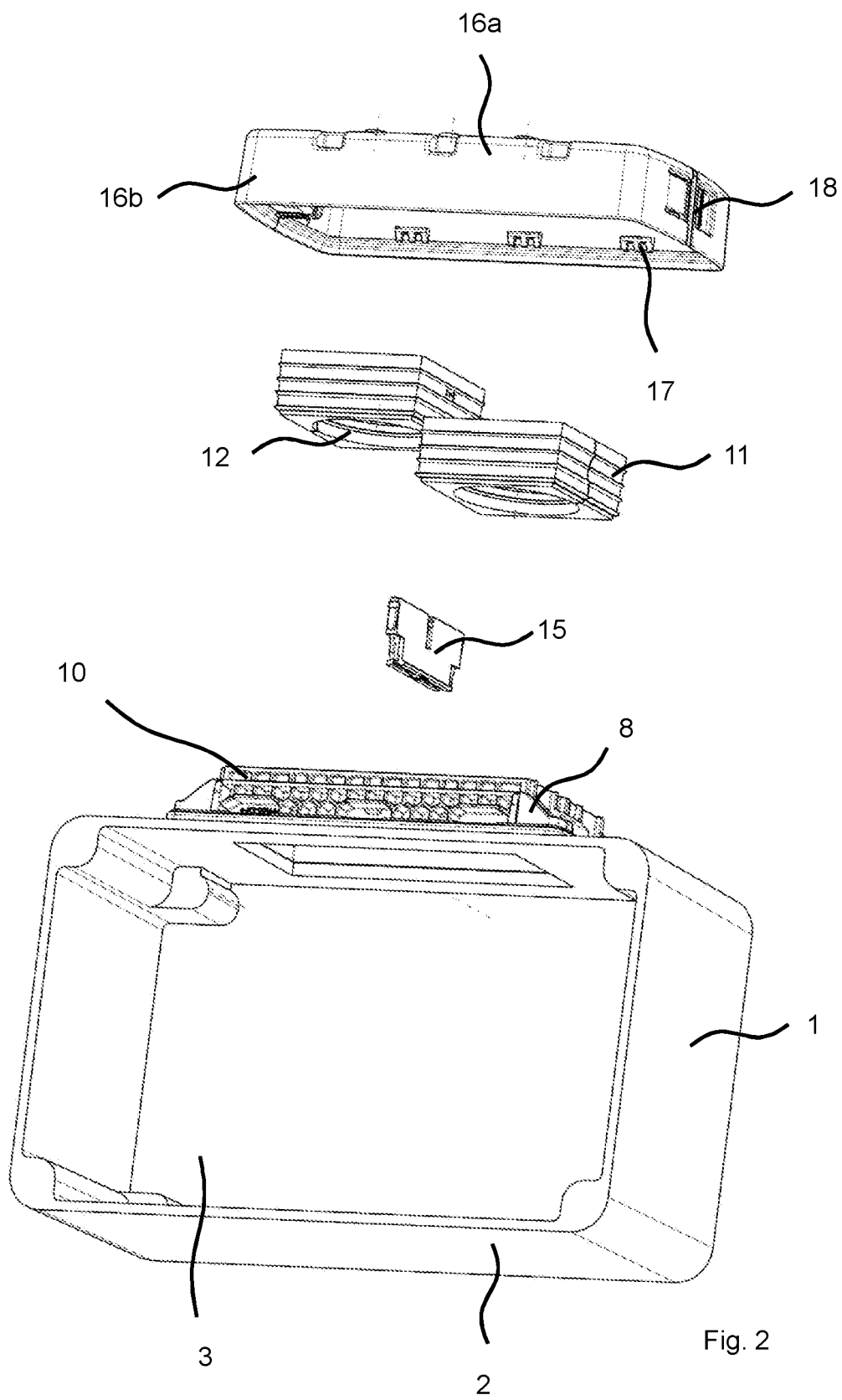
FIG. 2 is a further schematic perspective view of the arrangement from FIG. 1.

FIG. 2 shows a further perspective view of the arrangement from FIG. 1 with the cable wall lead-through that is still to be installed. Said cable wall lead-through is then designed according to the perspective view in FIG. 3 when the cover component 16 is also installed. When said cover component is installed, the components 16a, 16b are connected to one another in an installation direction that is transverse to the passage direction of the wall opening 5. For this purpose, the components 16a, 16b have mutually associated connecting elements 18 (see FIG. 1).

Figure 3:
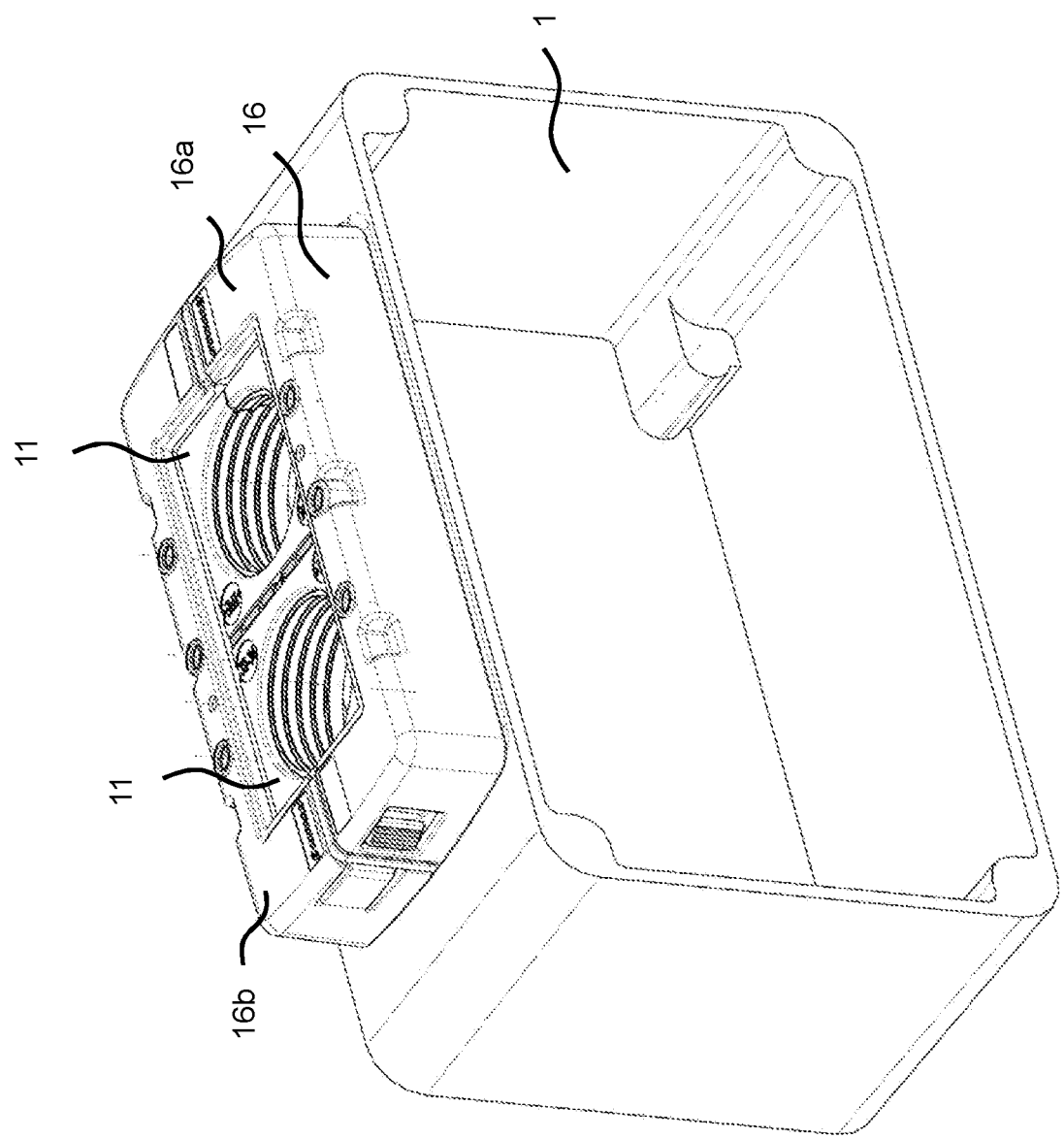
FIG. 3 is a schematic perspective view of the arrangement from FIG. 1 in which the cable wall lead-through is formed.
Figure 4:
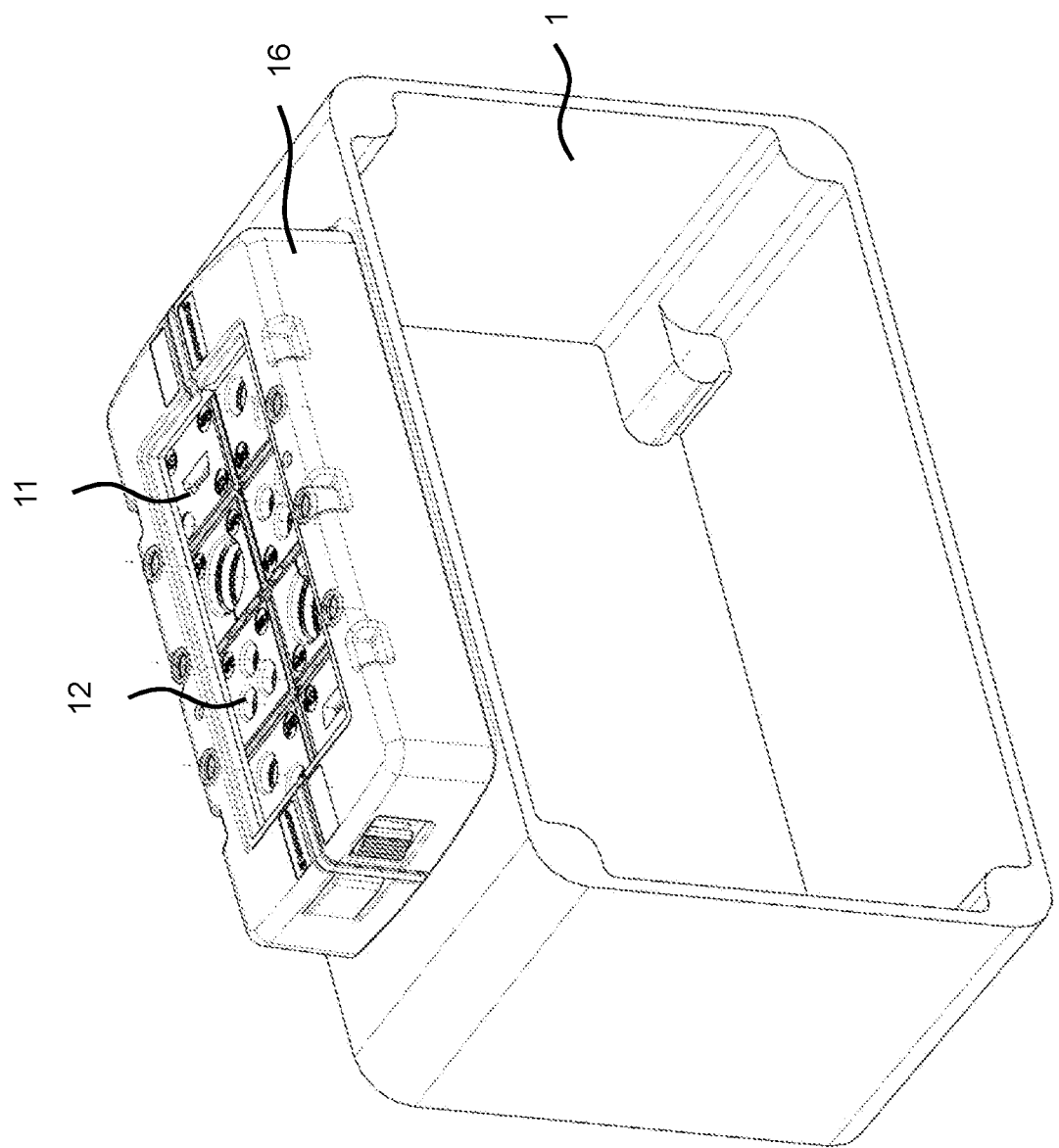
FIG. 4 is a schematic perspective view of a further arrangement having an installed cable wall lead-through on a housing.

FIG. 4 shows an alternative embodiment to the arrangement in FIG. 1, the same reference signs as in FIGS. 1 to 3 being used for the same features. In the embodiment in FIG. 4, more than two sealing elements 11 are arranged in the receptacle of the receptacle frame 6, the sealing elements 11 having one or more passages 12 for a respective cable, passages having a larger diameter being used, for example, for electrical supply lines, while passages having a smaller diameter can be used for data or control lines.

FIGS. 5 to 8 show embodiments that show the use of the cable wall lead-through explained with reference to FIGS. 1 to 4 in connection with a connector 20. For the same features, the same reference signs are used in FIGS. 5 to 8 as in FIGS. 1 to 4.

Figure 5:
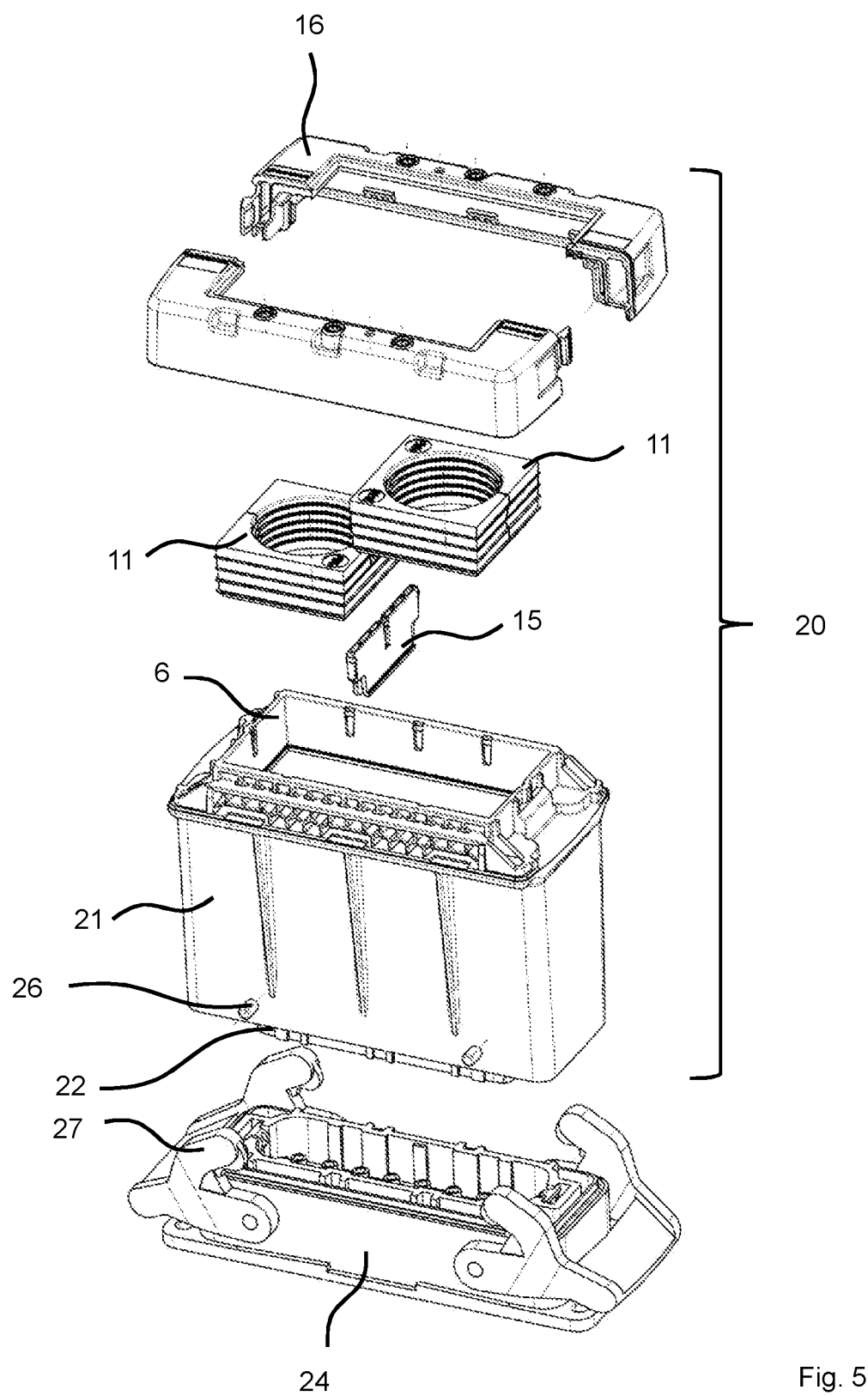
FIG. 5 is a schematic perspective view of an arrangement having a connector having a cable wall lead-through on a connector housing before the cable wall lead-through is formed.
Figure 6:
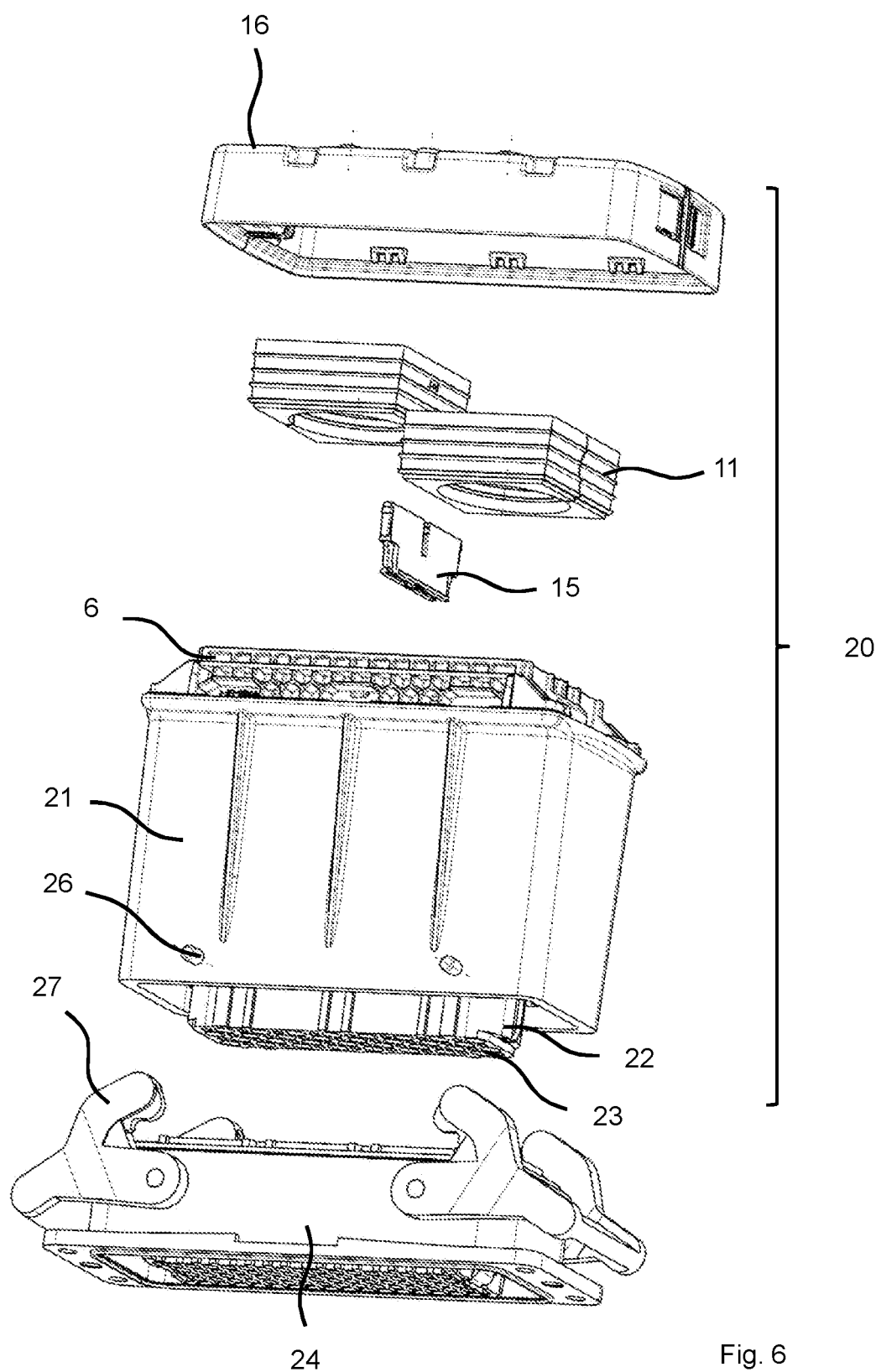
FIG. 6 is a further perspective view of the arrangement from FIG. 5.

In the embodiments in FIGS. 5 to 8, the housing 1 from FIGS. 1 to 4 is configured as a plug connector housing 21 that is used to receive a connector component 22 having electrical contact elements 23, such that the connector housing 21 can optionally be detachably connected to the cable wall lead-through with an associated socket 24 in order to form electrical connections for the plurality of cables or lines. In FIGS. 5 and 6, the cable wall lead-through is shown in the uninstalled state in a manner comparable to FIGS. 1 and 2. FIGS. 7 and 8 then show embodiments of the connector 20 (in conjunction with the associated socket 24) in which the cable wall lead-through is formed.

In order to secure the connector housing 21 on the socket 24, a securing device 25 is provided that, in the embodiment shown, has housing projections 26 on the connector housing 21 and associated pivot elements 27.

The features disclosed in the above description, the claims, and the drawings can be of relevance, both individually and also in any combination, for realizing the different embodiments.

What is claimed is:

1. An arrangement having a cable wall lead-through for a plurality of cables, comprising:
   a housing in which wall portions delimit a housing interior on several sides; and
   a cable wall lead-through arranged on the housing in a region of a wall opening that is formed in one of the wall portions of the housing to lead the plurality of cables through the wall opening, where an inwardly facing surface of the one of the wall portions faces and delimits the housing interior, the cable wall lead-through comprising the following:
   a feedthrough housing,
      the feedthrough housing comprising a receptacle frame that is integrally formed on the wall portion of the housing so as to at least partially encompass the wall opening and with which a receptacle is formed opposite the wall opening, and
      the feedthrough housing comprising a cover component associated with the receptacle frame,
   the cable wall lead-through further comprising
      at least one sealing element that is arranged in the receptacle and with which sealed passages are provided for the plurality of cables, each of which sealed passages is configured to receive in a sealing manner a cable to lead through the wall opening of the housing wherein the cover component is configured to securely install the at least one sealing element in the receptacle.

2. The arrangement according to claim 1, wherein the receptacle frame is formed with a frame wall that protrudes from the outer side of the wall portion and is integrally formed on the wall portion.

3. The arrangement according to claim 2, wherein the frame wall is formed with sup-porting wall portions that support the frame wall in a position that is upright on the outer side of the wall portion.

4. The arrangement according to claim 2, wherein the frame wall has honeycomb wall regions.

5. The arrangement according to claim 1, wherein the receptacle frame substantially completely encompasses the wall opening.

6. The arrangement according to claim 1, wherein a frame component is arranged in the receptacle, which frame component divides the receptacle into a plurality of sub-receptacles that are each configured to receive a sealing element with which at least one sealed passage is provided for one of the plurality of cables.

7. The arrangement according to claim 1, wherein the receptacle frame is configured for inserting the at least one sealing element into the receptacle space from the outside on a side facing away from the housing.

8. The arrangement according to claim 1, wherein the cover component is installed without tools.

9. The arrangement according to claim 1, wherein the cover component is installed with the help of a connecting device that is at least partially formed on the receptacle frame.

10. The arrangement according to claim 1, wherein, in the installed position, the cover component encompasses a housing corner region in which the wall portion is connected to an adjacent wall portion of the housing.

11. The arrangement according to claim 1, wherein the cover component, in a view onto the wall opening, is arranged such that it overlaps the at least one sealing element on the edge side.

12. The arrangement according to claim 1, wherein the cover component is formed in several parts with a plurality of cover elements in such a way that, while the cover component is installed, one of the cover elements is connected to at least one other of the cover elements with the help of mutually associated connecting elements.

13. The arrangement according to claim 1, wherein the housing is a plug connector housing that is configured to receive a plug connector component having electrical contact elements in the housing interior.

14. A plug connector having an arrangement according to claim 1.

* * * * *